(12) United States Patent
Fischer et al.

(10) Patent No.: US 7,559,874 B2
(45) Date of Patent: Jul. 14, 2009

(54) VEHICLE SHIFT MODULE

(75) Inventors: Gregory F. Fischer, Orion, MI (US); Donald J. Stewart, Royal Oak, MI (US); Scott Munro, Windsor (CA); Robert L. Brown, Waterford, MI (US); David P. Jacobs, Shelby Township, MI (US)

(73) Assignee: Chrysler LLC, Auburn Hills, MI (US)

( * ) Notice: Subject to any disclaimer, the term of this patent is extended or adjusted under 35 U.S.C. 154(b) by 372 days.

(21) Appl. No.: 11/461,074

(22) Filed: Jul. 31, 2006

(65) Prior Publication Data

US 2008/0026907 A1    Jan. 31, 2008

(51) Int. Cl.
*F16H 59/74* (2006.01)
(52) U.S. Cl. .............................. 477/99; 477/96; 74/335
(58) Field of Classification Search .................. 477/96, 477/99; 74/335, 473.1, 473.24; 70/237, 70/247, 248, 252, 357, 367
See application file for complete search history.

(56) References Cited

U.S. PATENT DOCUMENTS

| 5,309,744 | A  | * | 5/1994 | Kito et al. ...................... 70/247 |
| 6,192,770 | B1 | * | 2/2001 | Miyoshi et al. .......... 74/473.18 |
| 6,508,090 | B1 |   | 1/2003 | Hasegawa et al. |
| 6,547,696 | B2 | * | 4/2003 | Syamoto et al. ............... 477/99 |
| 7,270,623 | B2 | * | 9/2007 | Wang .......................... 477/96 |

* cited by examiner

*Primary Examiner*—David D. Le
(74) *Attorney, Agent, or Firm*—Ralph E. Smith (57) ABSTRACT

A shift mechanism for a transmission in a vehicle includes a housing, a shift lever, a key cylinder and an actuator. The actuator operably connects to the key cylinder and is capable of movement between a first position that prevents the shift lever from changing shift positions, and a second position that allows the shift lever to change shift positions.

20 Claims, 6 Drawing Sheets

VEHICLE SHIFT MODULE

FIELD OF THE INVENTION

This invention relates generally to shift modules for vehicles.

BACKGROUND OF THE INVENTION

Vehicles commonly have a key cylinder (lock body) to prevent drivers from removing the vehicle's ignition key while the vehicle is running and while the transmission is shifted out of the park position. The key cylinder can turn to several positions while the vehicle's ignition key is in the key cylinder, for example, "lock," "acc," "on," and "start." The key cylinder prevents the key from being removed while the key cylinder is in any position other than the "lock" position.

Modern vehicles also have a brake transmission shift interlock (BTSI) that interacts with the vehicle's shift lever. BTSIs prevent the driver from shifting the transmission out of the park position unless the vehicle brake is applied.

SUMMARY OF THE INVENTION

A shift mechanism for a transmission in a vehicle includes a housing, a shift lever, a key cylinder and an actuator. The shift lever is carried by the housing for movement between multiple shift positions. The key cylinder is carried by the housing and is operable to move between a lock position and an unlock position. The actuator operably connects to the key cylinder and the shift lever and is capable of movement between a first position that prevents the shift lever from changing shift positions, and a second position that allows the shift lever to change shift positions.

In another implementation, the shift mechanism includes a housing, a shift lever, a key cylinder, and an actuator. The shift lever is supported by the housing for movement between a park gear and at least one drive gear. The key cylinder is mounted on the housing and is operable to move between a lock position and an unlock position. The actuator operably connects to the key cylinder and the shift lever. The actuator is capable of movement between a first position and a second position. The first position blocks the shift lever from changing shift positions and allows the key cylinder to move between the lock position and unlock position. The second position allows the shift lever to change shift positions and prevents the key cylinder from moving to the lock position.

BRIEF DESCRIPTION OF THE DRAWINGS

Some potential objects, features and advantages of the present invention will be apparent from the following detailed description of the preferred embodiments and best mode, appended claims and accompanying drawings in which:

DETAILED DESCRIPTION OF PREFERRED EMBODIMENTS

Figure 1:
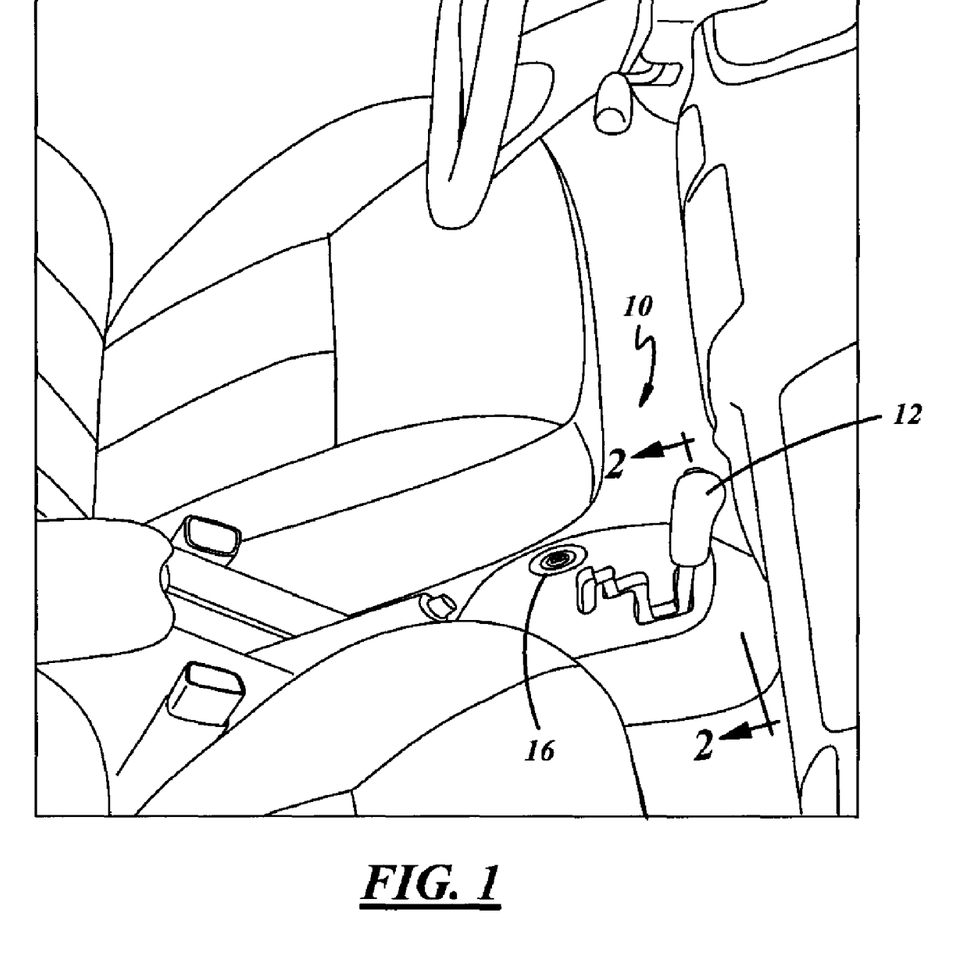
FIG. 1 is a perspective view of an embodiment of a shift mechanism mounted on the floor of a vehicle.

Referring in more detail to the drawings, FIG. 1 illustrates a shift mechanism 10 in a passenger vehicle, although the shift mechanism could be used in other vehicles. The shift mechanism prevents the transmission from being shifted out of park and into a drive gear unless the vehicle's ignition system and braking system is activated. The shift mechanism may also prevent the operator from turning a key cylinder to the "locked" or "off" position while the vehicle is in a drive gear and thereby prevent the key from being removed from the key cylinder unless the vehicle is in park. The shift mechanism's compact design allows it to be sized small enough for installation in a desired spot in the vehicle, such as within the instrument panel, steering column on or in the floor of the vehicle. Installation of the housing in the instrument panel may enable the driver to shift the vehicle while maintaining eye contact with the road.

Figure 2:
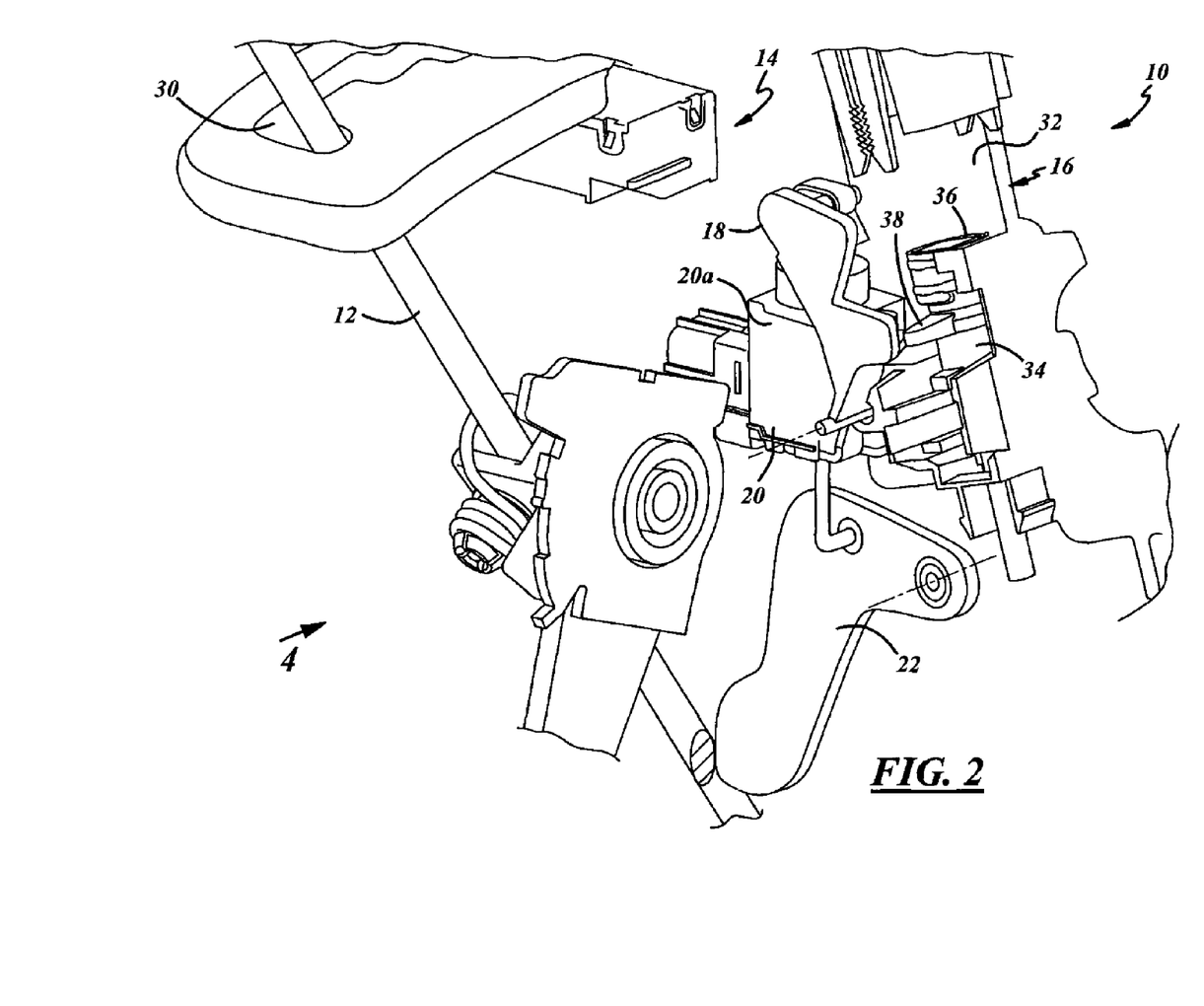
FIG. 2 is a fragmentary perspective view of the shift mechanism in FIG. 1.

The drawings show one presently preferred embodiment of a shift mechanism 10 for a vehicle. FIG. 1 shows the shift mechanism 10 mounted on the floor of a vehicle. The shift mechanism includes a shift lever 12, a housing 14, a key cylinder 16, a key inhibit linkage 18, an actuator 20, and a shift inhibit linkage 22 as shown in FIG. 2. The interconnections between shift levers and transmissions including rods, cables, and the like are known in the art and need not be described further herein. The housing 14 may carry the various components for the shift mechanism. This may allow the shift mechanism 10 to be installed and removed from the vehicle as a single compact unit. FIG. 2 shows the shift lever extending through a serpentine shift gate 30. The shift lever is pivotably mounted to allow the shift lever to move laterally as well as forward and aft between shift positions such as a park gear and drive gears.

Figures 3, 4, 5:
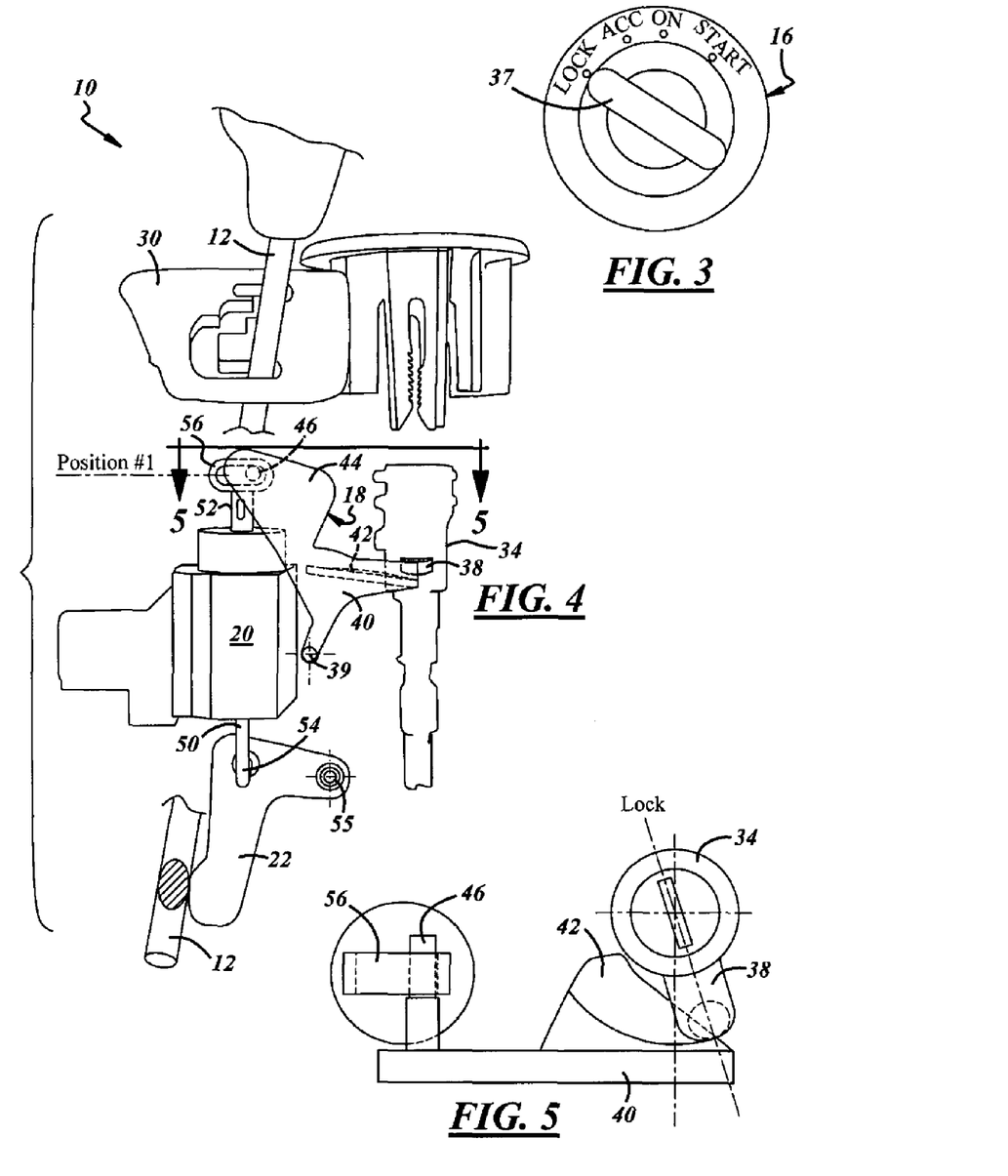
FIG. 3 is a top view of the key cylinder shown in FIG. 2 with the key in the "lock" position.
FIG. 4 is a side view of the shift mechanism in FIG. 2 showing a shift lever in its "park" position.
FIG. 5 is a fragmentary top view of the shift mechanism taken along line 5-5 of FIG. 4 and showing a key cylinder in the "lock" position.

The key cylinder 16 is mounted in the housing 14 and includes a cylindrical shell 32 and key shaft 34. The cylindrical shell 32 carries the key shaft 34 within the housing 14. The key shaft 34 is generally conical and has a key hole 36 to receive a key 37 for starting the vehicle. The key shaft 34 is mounted in the cylindrical shell 32 to allow the key shaft to rotate within the shell. A finger, lobe, or cam 38 extends laterally from the key shaft 34. The key shaft 34 with cam 38 rotates between a lock position and at least one unlock position. In this implementation, the key shaft 34 rotates within the cylindrical shell 32 between a "lock" position and several unlock positions: "acc", "on", and "start", as shown in FIG. 3. The cam 38 extends out of a partially enclosed portion of the cylindrical shell 32 thereby limiting the rotation of the key shaft 34 within the cylindrical shell. The key shaft 34 is coupled to the vehicle's ignition switch to activate vehicle power when the key shaft is in the "on", "acc", and "start" positions.

FIG. 4 shows the key inhibit linkage 18 which may be mounted on a pivot 39 carried by the housing 14. The key inhibit linkage 18 includes an arm 40 that extends over a portion of the cam 38 of the key shaft 34 when the key shaft is in the "on" and "acc" positions. FIG. 5 shows a top view of the arm 40 including a projection 42 extending along a side of the arm facing the key shaft 34. The projection 42 is sized to allow the key inhibit linkage 18 to freely pass over the cam 38 when the key shaft 34 is in the "start", "on", and "acc" positions and engage or interlock with the cam 38 when the key shaft 34 is in the "lock" position (FIG. 3). The key inhibit linkage 18 may also include an extension 44 that pivots into position over a portion of the actuator 20 as the key inhibit linkage moves from a first position to a second position. As shown in FIG. 4, the extension may include a pin 46 projecting from the extension to interact with the actuator 20.

Figures 9, 10, 11:
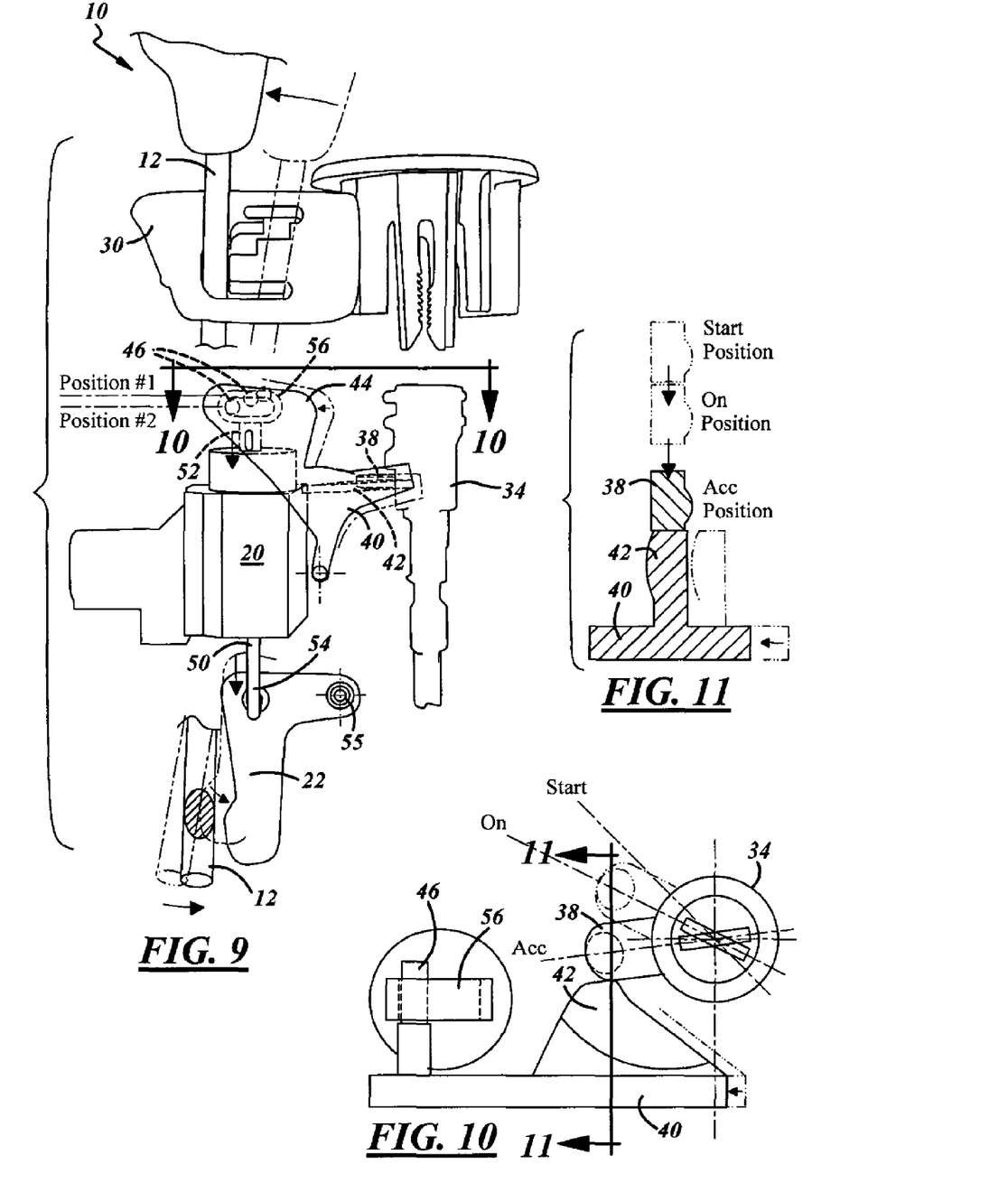
FIG. 9 is a side view of the shift mechanism in FIG. 2 showing the key cylinder in the "on" position and the shift lever out of "park"
FIG. 10 is a fragmentary top view of the key cylinder and a key inhibit linkage taken along line 10-10 of FIG. 9 showing the key inhibit linkage in a second position.
FIG. 11 is a fragmentary side view of the key cylinder and the key inhibit linkage taken along line 11-11 of FIG. 12.

The actuator 20 may be a solenoid mounted on the housing 14. The actuator 20 includes a rod 50 extending through the actuator 20 from a first end 52 near the pin 46 of the key inhibit linkage 18 to a second end 54 near the shift lever 12. The first end 52 of the rod may include an oval loop 56. The pin 46 extends through the oval loop 56 to link the key inhibit linkage 18 with the actuator 20. The second end 54 of the rod 50 pivotably connects to the shift interlock linkage 22. The actuator 20 extends and retracts the rod 50 to a first position and a second position when activated. In the first position, the first end 52 of the rod 50 is extended further from the solenoid housing 20a and the second end of the rod 50 is retracted further into the solenoid housing 20a as shown in FIG. 4. In the second position, the first end 52 of the rod 50 is retracted toward housing 20a and the second end 54 of the rod 50 is extended generally away from the actuator housing 20a as shown in FIG. 9. The solenoid may be configured to move between various positions upon energizing or de-energizing the solenoid, and many solenoid types and configurations may be substituted. For example, a rotary type solenoid could be substituted and linked to the key inhibit linkage and the shift inhibit linkage to link and move them between the described positions.

In this embodiment, the shift interlock linkage 22 is connected at one end by a pivot carried by the housing 14 and extends adjacent to the shift lever 12. The shift interlock linkage 22 pivots about the pivot 55 from a blocking position shown in FIG. 4 to an unblocking position shown in FIG. 9 when the actuator 20 moves from the first position to the second position. Pivoting the shift interlock linkage 22 into the blocking position prevents the shift lever 22 from being shifted out of park and into gear. As shown in FIG. 4, the serpentine gate 30 requires the shift lever to crossover or move laterally within the gate 30 in order to shift into gear. The shift interlock linkage 22 blocks the lateral movement of the shift lever 12 when the shift interlock linkage is in the blocking position of FIG. 4. In contrast, as seen in FIG. 9, the shift interlock linkage 22 is pivoted out of the path of the shift lever 12 when in the unblocking position to allow the lateral movement to occur and the shift lever 12 to be moved out of park.

The shift mechanism 10 may also interface with an electronic control unit (ECU) to control activation and deactivation of the solenoid. The ECU may be electrically connected to a vehicle bus to monitor the current state and/or position of the vehicle's safety systems, the transmission, and/or the shift lever 12. Alternatively, the ECU may be connected to individual sensors on the brake system, seat belt, door latch, lift gate, transmission, or shift lever to monitor their states and/or positions. The ECU may also be electrically coupled to the actuator 20 to energize and de-energize the actuator based upon the current state of the vehicle safety systems, transmission, and the shift lever 12.

The shift mechanism 10 may be compact in design to enable it to fit in a variety of locations within the vehicle's passenger compartment, such as the instrument panel near the steering wheel or on the floor. Installing the shift mechanism on the instrument panel may enable drivers to shift gears without having to take their eyes off of the road.

Operation of this embodiment of the shift mechanism 10 will now be described. While the key shaft 34 is in the "lock" position seen in FIG. 3, the actuator 20 is de-energized, the rod 50 is in the first position, and the shift lever 12 is in park as shown in FIG. 4. The shift interlock linkage 22 is in the blocking position to prevent the shift lever 12 from being shifted out of park. The key inhibit linkage 18 is in a first position with the cam 38 extending generally toward the arm 40 of the key shaft 34. The projection 42 of the key inhibit linkage 18 is engaged with the cam 38 to maintain the key inhibit linkage 18 in the first position as shown in FIG. 5. Maintaining the key inhibit linkage 18 in the first position prevents the shift interlock linkage 22 from rotating out of the blocking position because both are coupled together through the actuator 20. Thus, the interlocking of the key shaft 34 and the key inhibit linkage 18 prevents the shift interlock linkage 22 from being moved out of the blocking position because the shift inhibit linkage is coupled to the key inhibit linkage through the actuator 20. In addition, the actuator 20 maintains the rod 50 in the first position while the actuator is not energized.

Figures 6, 7, 8:
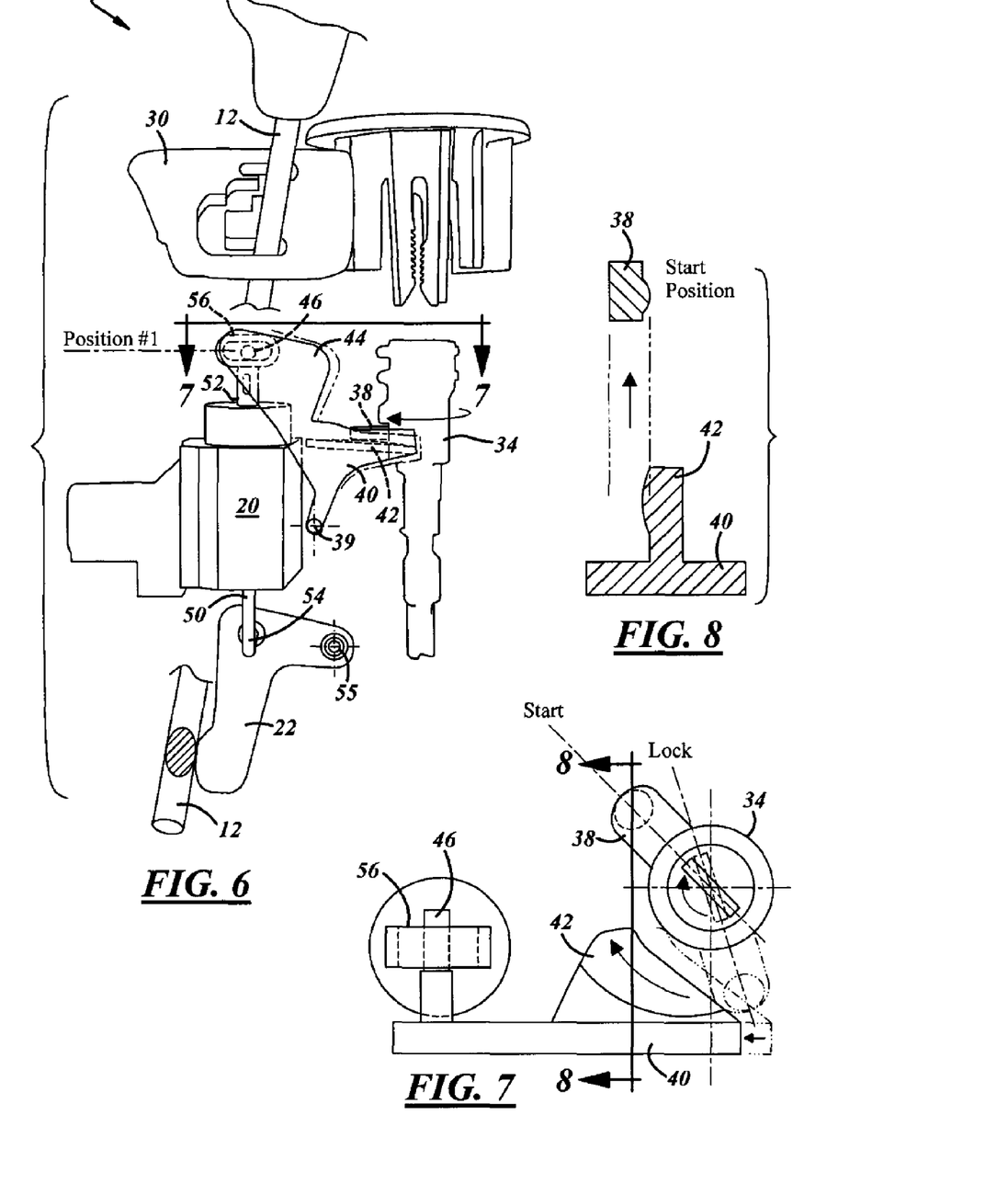
FIG. 6 is a side view of the shift mechanism in FIG. 2 showing the key cylinder in the "start" position and the shift lever in "park"
FIG. 7 is a fragmentary top view of the key cylinder and a key inhibit linkage taken along line 7-7 of FIG. 6 showing the key cylinder in the "Start" position.
FIG. 8 is a fragmentary side view of the key cylinder and the key inhibit linkage taken along line 8-8 of FIG. 7.

When the key 37 is rotated in the key cylinder away from the "lock" position, the key may become trapped in the key cylinder 16 to prevent its removal. Rotation of the key from the "lock" position may also cause the actuator to be energized. Energizing the actuator 20 maintains the rod 50 in the first position and the shift inhibit linkage 22 in the blocking position. As shown in FIG. 6, rotating the key and, correspondingly, the key shaft 34 to the "acc" position rotates the cam 38 toward the actuator 20 and removes the interlock between the cam and the projection 42 of the key inhibit linkage 18. FIG. 7 shows the interaction between the cam 38 and the projection 42 of the key interlock linkage 18 as the key shaft 34 rotates. Once the engine is started, the key shaft 34 is rotated to the "on" position. But, as best seen in FIG. 8, the locations of the cam 38 and the projection 42 allow the key shaft 34 to be turned back to the "lock" position to turn the vehicle off if desired.

The shift lever 12 continues to be blocked by the shift inhibit linkage 22 while the actuator 20 is energized and the rod 50 is in the first position. The shift inhibit linkage 22 moves from the blocking position to the unblocking position while a safety system is activated when the key shaft 34 is in the "on" position and the shift lever is in "park." In this embodiment, the safety system is the vehicle brake system. The ECU detects the activation of the brake system and sends a release signal to the actuator 20 to de-energize the actuator and move the rod 50 to the second position. The ECU may also require other safety systems in the vehicle to be in a particular state before it sends a release signal. For example, the seat belts, door latches, or lift gates may have to be latched. Moving the rod 50 to the second position rotates the shift inhibit linkage 22 to the unblocking position as shown in FIG. 9. More specifically, in this embodiment, the movement of the rod 50 to the second position causes the rod 50 to push the shift inhibit linkage 22 to the unblocking position. In addition, moving the rod 50 to the second position causes the loop 56 on the rod 50 to engage and displace the pin 46 of the key inhibit linkage 18 and thereby rotate the key inhibit linkage to a second position shown in FIGS. 9 and 10. But if the brake system is deactivated while the key shaft 34 is in the "on" position and the shift lever 12 is in "park," the ECU will detect the brake system deactivation and will send a signal to energize the actuator 20 and move the rod back to the first position and thus move the shift interlock linkage 22 to the blocking position and the key inhibit linkage 18 to the first position. In that situation, the shift lever 12 would again be blocked against movement out of its park position.

The shift lever 12 may be shifted out of "park" while the brake system is activated and the key shaft 34 is in the "on" position. When shifted out of park, the shift lever 12 is preferably clear of the shift inhibit linkage 22 so that the shift lever may be moved to its various other positions. The ECU detects a gearshift when the shift lever 12 is shifted out of park so that subsequent deactivation of the brake system will not cause the actuator 20 to be energized. Keeping the actuator 20 in the de-energized state maintains the shift inhibit linkage 22 in the unblocking position so that the shift lever 12 may be moved back into its park position as described.

While in a drive gear (i.e. out of park), the key inhibit linkage 18 functions to prevent removal of the key 37 from the key shaft 34. Although the key shaft 34 is free to turn from "on" to "acc", the key inhibit linkage 18 prevents the key shaft 34 from turning to the "lock" position. As best seen in FIG. 11, the projection 42 of key inhibit linkage 18 blocks the cam 38 on the key cylinder 34 from rotating back to the "lock" position. In this embodiment, the "lock" position is the only position that releases the key 37 from the key shaft 34 and allows it to be removed although other arrangements may be designed. While the transmission is out of park, the actuator 20 maintains the position of the rod 50 to hold the key inhibit linkage 18 in the second position via the interaction of the loop 56 and the pin 46. While in the second position, the arm 40 blocks the path of the cam 38 and prevents the key shaft 34 from rotating from the "on" or "acc" positions to the "lock" position.

Figures 12, 13:
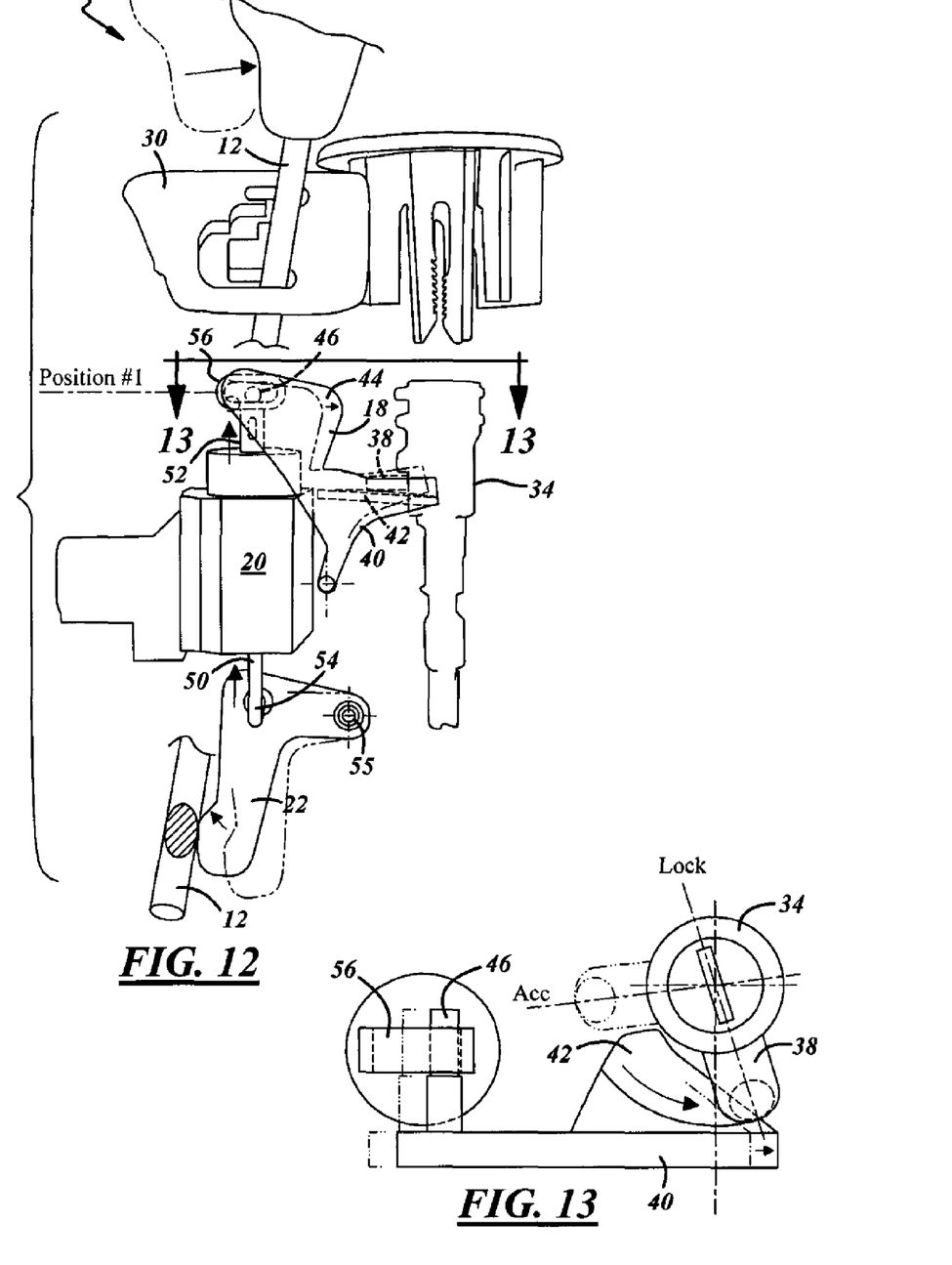
FIG. 12 is a side view of the shift mechanism in FIG. 2 showing the key cylinder in the "on" position and the shift lever in "park"
FIG. 13 is a fragmentary top view of the key cylinder and a key inhibit linkage taken along line 13-13 of FIG. 12 showing the key cylinder in the "lock" position.

While the shift lever 12 is still in a drive gear and the key shaft 34 is in the "on" or "acc" positions, the transmission may be shifted into park while the brake system is activated. Once the transmission is shifted into park, the ECU detects the shift position or transmission state and sends a signal to energize the actuator 20 and cause the rod 50 to shift to the first position as seen in FIG. 12. Moving the rod 50 to the first position moves the shift inhibit linkage 22 to the blocking position to prevent the shift lever 12 from being shifted back out of park (unless the brake system is activated as discussed above). Moreover, the rod 50 pushes the key inhibit linkage 18 to the first position. The arm 40 rotates out of the path of the cam 38 as the key inhibit linkage 18 rotates into the first position.

Now that the transmission is safely shifted in "park", the key shaft 34 may be turned to the "locked" position to allow the key 37 to be removed while the brake system is deactivated. The key shaft 34 is able to turn to the "locked" position because the first position for the key inhibit linkage 18 provides sufficient clearance for the cam 38 on the key shaft 34 to rotate. As the key shaft 34 is turned to the "locked" position, the cam 38 rotates generally toward the arm 40 of the key inhibit linkage 18 as shown in FIG. 13. With the key shaft 34 in the "locked" position, the projection 42 of the key inhibit linkage 18 is interlocked with the cam 38 to prevent the key inhibit linkage from rotating from the first position. The engagement of the key shaft 34 and the key inhibit linkage 18 prevents the shift interlock linkage 22 from being moved out of the blocking position.

As can be seen from the description above, the shift mechanism combines the features of a locking key shaft and a BTSI into a single unit. The shift mechanism 10 prevents the transmission from being shifted into a drive gear from park unless the vehicle's brake is activated. But the transmission cannot be shifted into a drive gear from park while the key shaft 34 is in the "locked" position. The key shaft 34 is integrated into the shift mechanism 10 along with the shift inhibit linkage 18. The key shaft 34 prevents the operator from turning the key to the "locked" or "off" position while the vehicle is in a drive gear and therefore prevents the key 37 from being removed from the key shaft 34 unless the vehicle transmission is in park.

The shift mechanism 10 may also be used in conjunction with an in-line gate for the shift lever 12. In-line gates do not require the shift lever 12 to cross-over or move laterally to shift from park to a drive gear. In order to block the shift lever 12, the shift inhibit linkage 18 is configured to connect to the second end of the rod 50 and extend from the rod to a position adjacent the shift lever 12 and across the in-line path of the shift lever. The shift inhibit linkage 18 is positioned such that it blocks the shift lever 12 from moving from park to a drive gear while the actuator 20 is in the first position, but does not block the shift lever 12 when the actuator is in the second position. Thus, the rod 50 moves the shift inhibit linkage 22 a sufficient distance from the blocking position to the unblocking position to enable the shift lever 12 to move from park to the any of the drive gears without interfering with the path of the shift lever when in the unblocking position. The shift inhibit linkage 22 may be a mere extension of the rod 50 and need not be a separate component from it. Alternatively, in-line shift levers 12 may also contain a button and/or a plunger for releasing the shift lever 12 to allow the shift lever 12 to shift into gear. Therefore, the rod 50 or the shift inhibit linkage 22 may be used to block the path of the button or plunger when the actuator 20 is in the first position, and thereby prevent the shift lever 12 from being shifted into gear.

It is to be understood that the above description is intended to be illustrative and not limiting. Many embodiments will be apparent to those of skill in the art upon reading the above description. For example, the actuator 20 may be any variety electromechanical devices that provide linear activation to modify the positions of the key inhibit linkage 18 and the shift inhibit linkage 22. The actuator 20 may operate opposite of the description above such that the actuator may change positions upon being energized and maintain the first position when de-energized. Moreover, the linkages may be adapted to accommodate the modification and maintain the position of the actuator 20 when de-energized. A variety of solenoid, motor, or linear actuator types and styles may be substituted for the actuator 20. Additional actuator 20 positions are also possible, such as to prevent the shift lever 12 from shifting from a drive gear to a reverse gear or a park gear unless the brake system is activated and/or the speed of the vehicle is below a specific threshold. In addition, the actuator 20 may consist of separate components to move the key inhibit linkage 18 and the shift inhibit linkage 22. Moreover, the key inhibit linkage 18 and the shift inhibit linkage 22 may be modified to interact with the key shaft 34 and the shift lever 12 through lateral movement rather than the pivotal movement shown in the exemplary embodiments. Of course, still other embodiments, implementations and modifications will be apparent from this disclosure.

For example, it will be obvious to those skilled in the art that the various embodiments may be further modified by eliminating the key inhibit linkage 18 and/or the shift inhibit linkage 22. The key shaft 34 and the shift lever 12 may be orientated such that the ends of the actuator rod 50 may substitute for the key inhibit linkage 18 and/or the shift inhibit linkage 22. For example, the key inhibit linkage 18 can be eliminated by positioning the key shaft 34 adjacent the first end 52 of the actuator rod 50. Moreover, the shift inhibit linkage 22 can be eliminated by locating shift lever 12 such that the lateral movement of the shift lever is blocked by the second end 54 of the rod 50 when the rod is in the first position.

Relative descriptive terms like "adjacent," "push," "pull," "above," "near," and the like are used with reference to the orientation of the preferred embodiment shift module as shown in the drawings and are not intended to limit the scope of the invention. Therefore, the scope of the invention should be determined, not with reference to the above description, but instead with reference to the appended claims, along with the full scope of equivalents to which such claims are entitled.

The invention claimed is:

1. A shift mechanism for a transmission in a vehicle comprising:
  a housing;
  a shift lever carried by the housing for movement between multiple shift positions;
  a key cylinder carried by the housing and operable to move between a lock position and an unlock position; and
  an actuator operably connected to the key cylinder and the shift lever, the actuator capable of movement between:
  a first position that prevents the shift lever from changing shift positions, and
  a second position that allows the shift lever to change shift positions, and
  a shift interlock linkage pivotally linked to the actuator that blocks the shift lever from changing position when the actuator is in the first position and that allows the shift lever to change position when the actuator is in the second position.

2. The shift mechanism of claim 1 wherein the actuator comprises a reciprocable rod that is reciprocable between the first actuator position and the second actuator position, and wherein the shift interlock linkage is movably connected to the actuator rod such that the shift interlock linkage is urged by the actuator rod from a blocking position to an unblocking position when the actuator rod moves from the first position to the second position and the blocking position is located to block the shift lever from changing positions and the unblocking position is located to allow the shift lever to change positions.

3. The shift mechanism of claim 1 wherein the shift lever passes through a serpentine style shift gate.

4. The shift mechanism of claim 1 wherein the shift lever is of an in-line style shift lever.

5. The shift mechanism of claim 1 wherein the actuator is located in the first position when the key cylinder is in the lock position, and the actuator maintains the first position until the key cylinder moves from the lock position to the unlock position and the actuator receives a release signal to move the actuator to the second position.

6. The shift mechanism of claim 5 wherein the release signal is generated during activation of a safety system within the vehicle.

7. The shift mechanism of claim 1 further comprising a key inhibit linkage pivotally linked to the actuator that prevents the actuator from moving from the first position to the second position while the key cylinder is in the lock position.

8. The shift mechanism of claim 7 wherein the key cylinder moves the key inhibit linkage to allow the actuator to move from the first position to the second position when the key cylinder moves from the lock position to the unlock position.

9. The shift mechanism of claim 1 further including a key inhibit linkage connected to the actuator to prevent the key cylinder from moving from the unlock position to the lock position while the actuator is in the second position.

10. The shift mechanism of claim 9 wherein the key cylinder includes a cam portion and the cam portion interacts with the key inhibit linkage to prevent the key cylinder from moving from the unlock position to the lock position while actuator is in the second position.

11. A shift mechanism for a transmission in a vehicle, comprising:
  a housing;
  a shift lever supported by the housing for movement between shift positions;
  a key cylinder mounted on the housing and operable to move between a lock position and an unlock position; and
  an actuator operably connected to the key cylinder and the shift lever, the actuator capable of movement between:
  a first position that blocks the shift lever from changing shift positions and allows the key cylinder to move between the lock position and unlock position; and
  a second position that allows the shift lever to change shift positions and prevents the key cylinder from moving to the lock position and
  a key inhibit linkage pivotally connected to the actuator that prevents the actuator from moving from the first position to the second position while the key cylinder is in the lock position.

12. The shift mechanism of claim 11 wherein the actuator comprises a movable rod that is displaceable between the first actuator position and the second actuator position, and wherein the key cylinder moves the key inhibit linkage that allows the actuator rod to move from the first position to the second position when the key cylinder moves from the lock position to the unlock position.

13. The shift mechanism of claim 11 wherein the actuator is located in the first position when the key cylinder is in the lock position, and the actuator is maintained in the first position until the key cylinder moves from the lock position to the unlock position and the actuator receives a release signal to move the actuator to the second position.

14. The shift mechanism of claim 13 wherein the release signal is generated during application of a safety system within the vehicle.

15. The shift mechanism of claim 11 further including a shift interlock linkage connected to the actuator to block the shift lever from changing positions when the actuator is in the first position, and to allow the shift lever to change positions when the actuator is in the second position.

16. The shift mechanism of claim 15 wherein the shift interlock linkage is movably connected to the actuator such that the shift interlock linkage moves from a blocking position to an unblocking position when the actuator moves from the first position to the second position such that the blocking position is located to block the shift lever from changing positions and the unblocking position is located to allow the shift lever to change positions.

17. The shift mechanism of claim 11 wherein the key inhibit linkage is pivotally connected to a reciprocable rod of the actuator and configured to prevent the key cylinder from moving from the unlock position to the lock position while actuator is in the second position.

18. The shift mechanism of claim 17 wherein the key cylinder includes a cam portion and the cam portion interacts with the key inhibit linkage to prevent the key cylinder from moving from the unlock position to the lock position while actuator is in the second position.

19. A shift mechanism for a transmission in a vehicle, comprising:

a housing;

a shift lever supported by the housing for movement between shift positions;

a key cylinder mounted on the housing and operable to move between a lock position and an unlock position; and an actuator operably connected to the key cylinder and the shift lever, the actuator having an actuator body that operably cooperates with a movable actuator rod that is capable of movement between:

a first position that blocks the shift lever from changing shift positions and allows the key cylinder to move between the lock position and unlock position, and a second position that allows the shift lever to change shift positions and prevents the key cylinder from moving to the lock position;

a shift interlock linkage pivotally linked to the actuator rod at or adjacent one end of the actuator rod that moves in response to actuator rod movement with the shift interlock linkage opposing the shift lever from changing position when the actuator rod is disposed in the first position and enabling the shift lever to change positions when the actuator rod is disposed in the second position; and a key inhibit linkage pivotally linked to the actuator rod at or adjacent an opposite end of the actuator rod that prevents the actuator rod from moving from the first position to the second position while the key cylinder is in the lock position.

20. The shift mechanism of claim 19 wherein the key cylinder further comprises a cam portion that cooperates with a projection of the key inhibit linkage that prevents the key cylinder from moving from the unlock position to the lock position when actuator rod is disposed in the second position.

* * * * *